June 2, 1925.

E. A. MEACHAM

FRUIT PITTING MACHINE

Original Filed May 8, 1920  4 Sheets-Sheet 1

1,540,138

INVENTOR
Ernest A Meacham
BY
William A. Stock
ATTORNEY.

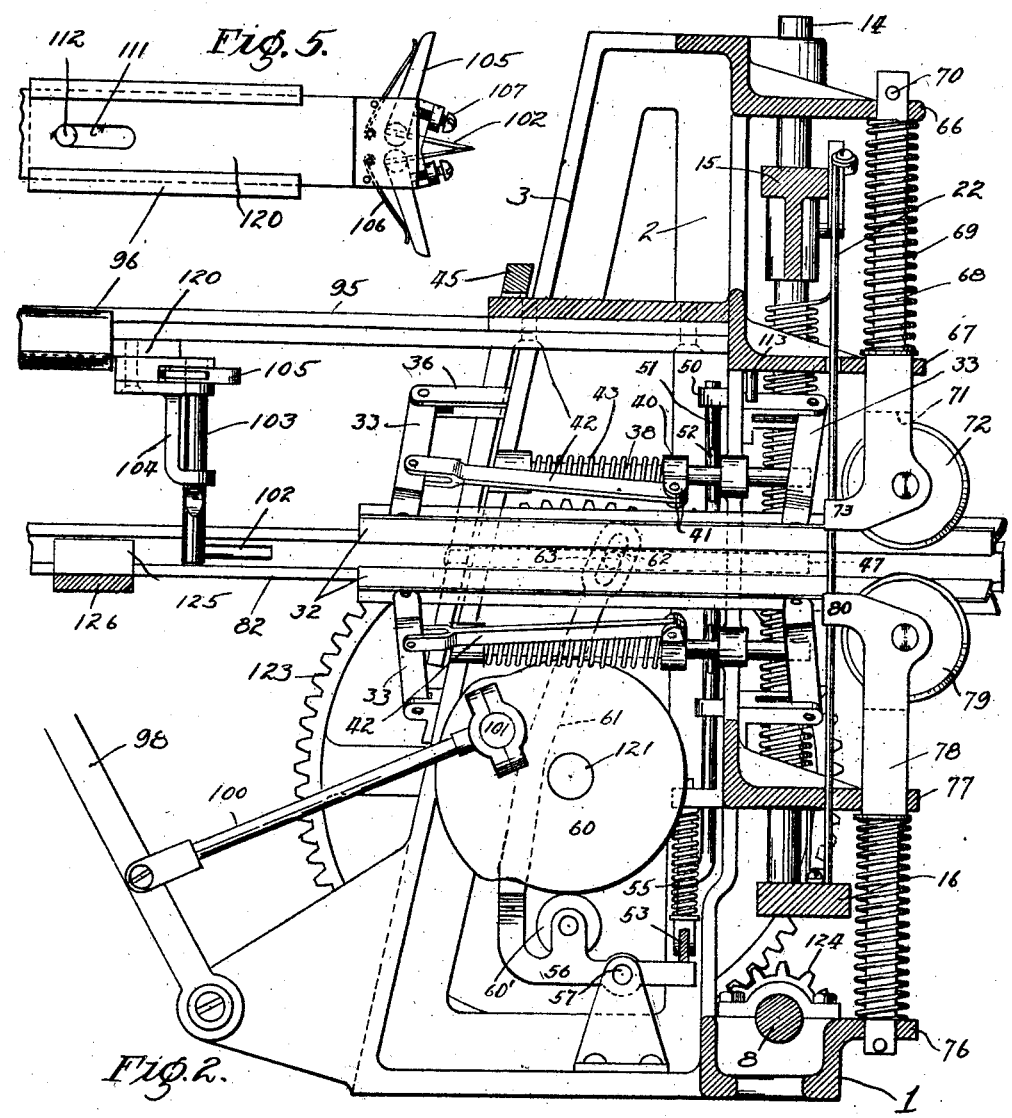

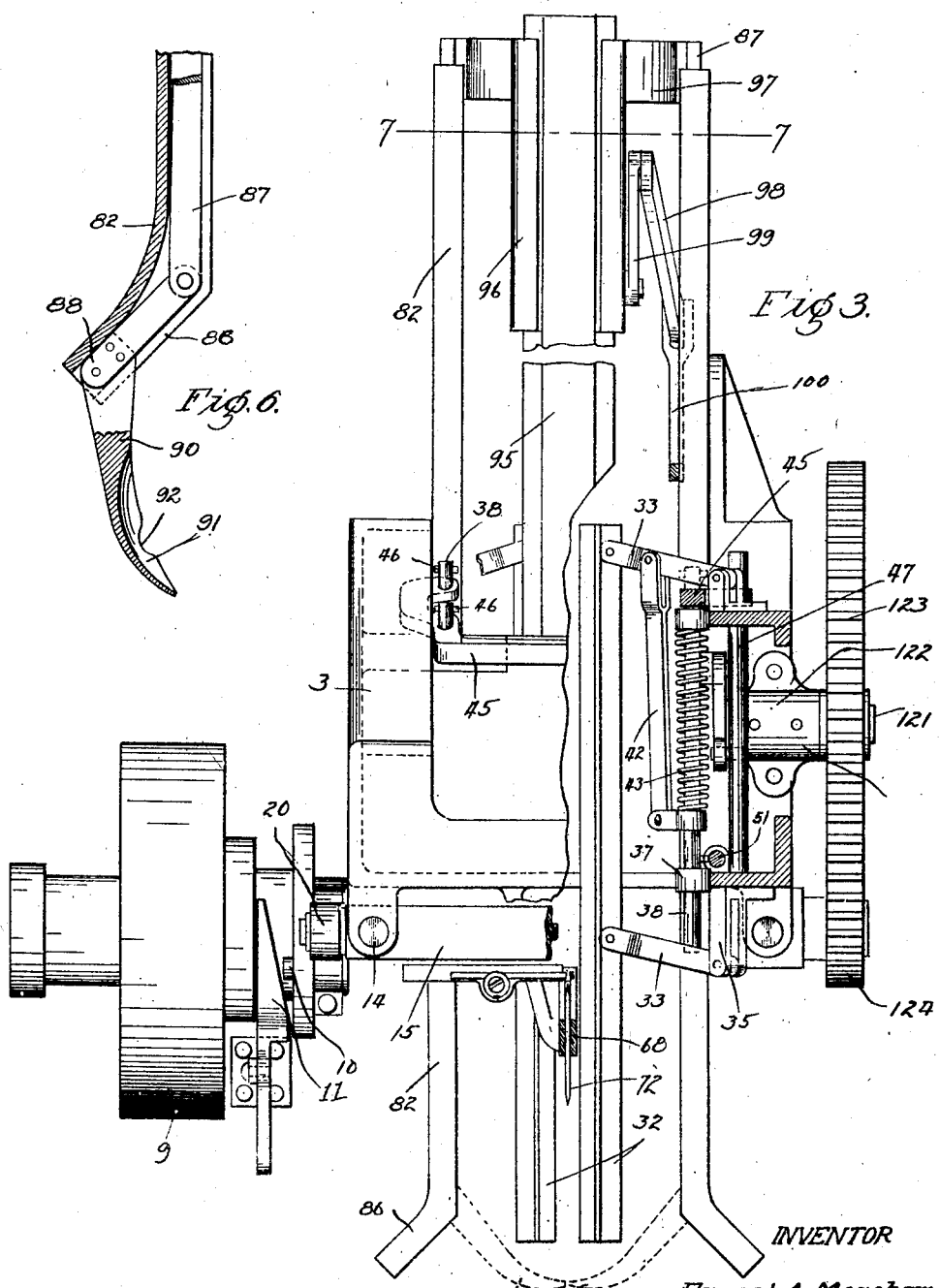

June 2, 1925. 1,540,138
E. A. MEACHAM
FRUIT PITTING MACHINE
Original Filed May 8, 1920   4 Sheets-Sheet 4

INVENTOR
Ernest A Meacham
BY
William A. Stock
ATTORNEY.

Patented June 2, 1925.

1,540,138

UNITED STATES PATENT OFFICE.

ERNEST A. MEACHAM, OF OAKLAND, CALIFORNIA, ASSIGNOR, BY MESNE ASSIGNMENTS, TO CALIFORNIA PACKING CORPORATION, OF SAN FRANCISCO, CALIFORNIA, A CORPORATION OF NEW YORK.

FRUIT-PITTING MACHINE.

Application filed May 8, 1920, Serial No. 379,745. Renewed March 7, 1923.

*To all whom it may concern:*

Be it known that I, ERNEST A. MEACHAM, a citizen of the United States, residing at the city of Oakland, in the county of Alameda and State of California, have invented certain new and useful Improvements in Fruit-Pitting Machines, of which the following is a specification.

This invention relates to a machine for removing the seed or pit from fruit and more particularly from peaches of the clingstone varieties.

The principal object of my invention is to provide a machine which will cut the fruit in two parts and automatically remove the pit with a minimum amount of waste. To accomplishing the above object, I provide a form of a flexible knife which is of such a character that it may conform to the outline of the peach pit and thereby sever the latter from the fruit with but a small amount of the flesh remaining on the pit.

Another object of the invention is to provide means for holding fruit of varying sizes and shapes in a position substantially central with respect to the flexible cutting knives and to the knives which cut the fruit in half. The holding means above mentioned, not only conforms to the irregular contour of the fruit but also provide parallel guideways to permit the longitudinal movement of the fruit in order that it may pass the flexible cutting knives.

I also provide means for spreading the flexible knives over the fruit pit and for seizing the latter and holding it while it and the fruit is passing the knives.

Further objects of my invention are to provide a novel form of pusher for carrying the fruit along the guide-ways above mentioned and to provide means for locking the parallel guides in position after they have adjusted themselves to the irregular contour of the peach.

With these and other objects in view my invention consists in certain novel features of construction, combinations and arrangements of parts herein illustrated and more particularly pointed out in the appended claims.

Reference being had to the accompanying drawings forming a part of this specification:

Figure 2 is a view in vertical cross-section substantially at the center of the machine.

Figure 3 is a view partly in plan and partly in horizontal cross-section.

Figure 5 is a view in plan of the mechanism for spreading the flexible knives.

Figure 6 is an enlarged view in section through the guide and the pusher arm which is slidably mounted therein.

Figure 1:
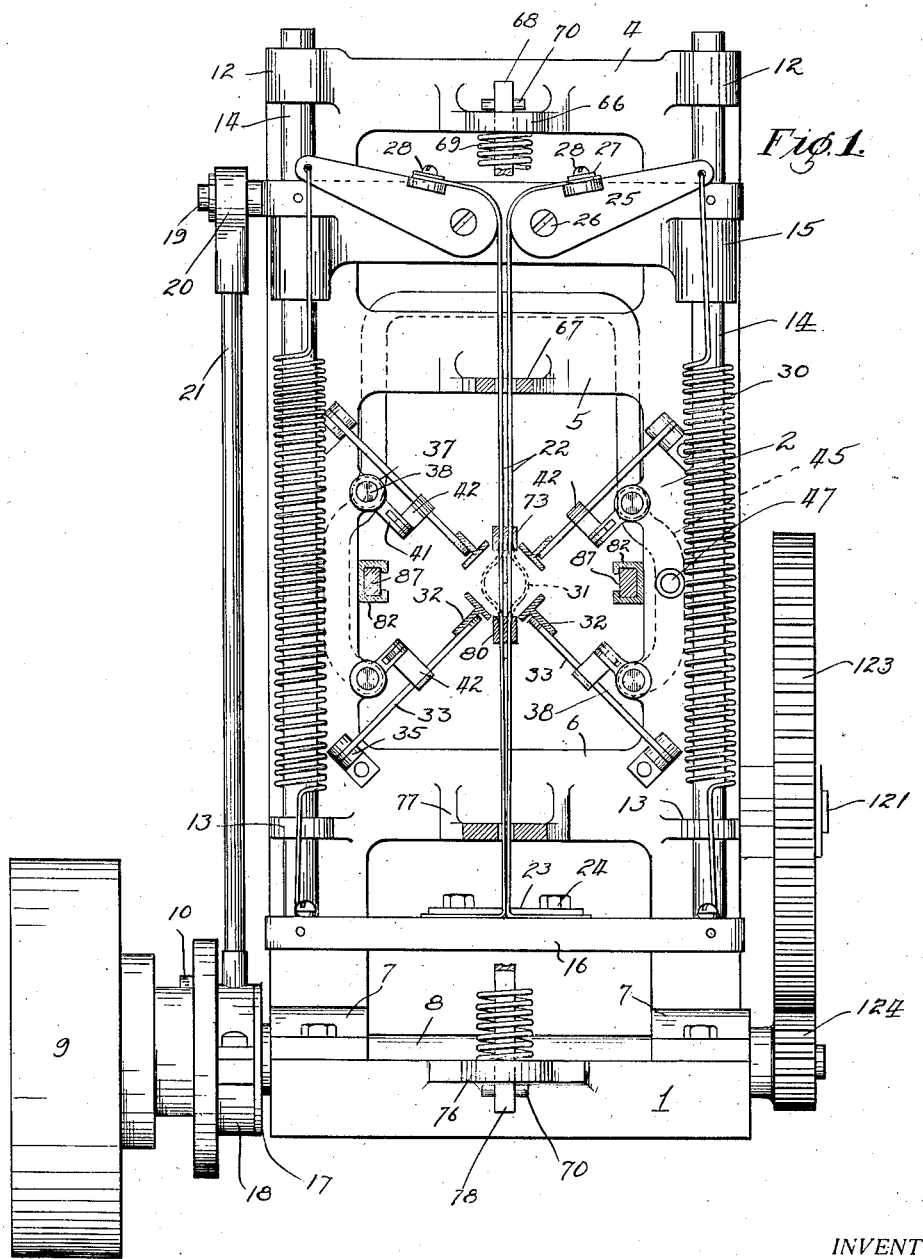
Figure 1 is a view in front elevation of my improved fruit pitting machine.

Referring to corresponding parts by the several views of the same numerals of reference, the machine comprises a frame consisting of a base 1, the vertical uprights 2 and the inclined brace members 3. The upright members 2 are connected by cross members 4, 5, and 6 and the base is provided with suitable bearings 7 in which is journaled the operating shaft 8. The latter is driven by means of a clutch mechanism within the driving pulley 9, the said clutch mechanism being operated by means of the pin 10. This clutch is of the well known type in which the withdrawal of the pawl 11 allows the clutch mechanism to engage and rotation continue until such time as the pawl is again dropped into position and releases the clutch engaging means.

On the face of the upright members 2 are guides 12 and 13 in which are slidably mounted rods 14. These rods are connected at their upper and lower ends respectively by the yoke 15 and bar 16. On shaft 8 is an eccentric 17 which is revolvably mounted within the eccentric strap 18. Extending from one side of yoke 15 is a pin 19 on which is oscillatively mounted the bearing member 20 which is connected to the eccentric strap by means of the rod 21. By this construction when the shaft is rotated, the yoke and bar 16, together with the two rods move vertically in the bearings 12 and 13.

Extending between the bar 16 and the yoke, are two thin flexible cutting knives denoted by 22. These knives at their lower ends are clamped to the surface of the bar in any preferred manner, such as by the clips 23 and bolts 24. The knives are mounted on the yoke in such a manner that a constant tension is maintained on them. This mounting consists of two levers, one for each knife, the levers being denoted by 25 and being oscillatively mounted as on the screws 26. The adjacent ends of the levers are formed on an arc, the centers of which are coincident with their pivotal points. The upper ends of the knives are brought around these arcuate ends and are clamped by being passed under the washers 27 which in turn are held by screws 28. A constant tension is maintained on the outer ends of the levers as by the coil springs 30, which surrounds the rods 14 and have their lower ends affixed to the bar 16. Not only does this construction maintain a uniform tension on the knives, but it also permits their being spread apart as shown in dotted lines at 31, even when thus spread, approximately the same amount of tension is maintained on the knives.

The fruit to be pitted is held in an adjustable tube, consisting of parallel members 32 mounted so that they will adjust themselves to the irregular surface of the fruit which may be placed therebetween. Means are provided for holding these parallel members in a given fixed relation to the fruit until such a time as the latter has been passed through the machine, is pitted and cut in half. As here shown, each of these members consist of a T-shaped bar, having a flat or slightly curved surface which is tangential to a common median line towards which these bars tend to converge. Each bar has pivotally attached to it two links denoted by 33, the other ends of which are pivotally mounted on suitable brackets 35 and 36 which extend from the faces of vertical uprights, and the rear of inclined brace members 3 respectively. These links being the same length, will for any given position of the guide bar maintain the latter in parallel relation to the above mentioned median line.

Slidably mounted in lugs 37 which are formed on the inner edges of the upright and brace members, are rods 38, these rods each having attached thereto a collar 40 having ears 41 in which is pivotally mounted a connecting bar 42. The other end of this bar is pivotally connected to one of the link members 33 so that for a horizontal movement of the rods 38, a greater movement will be imparted to the guide bars 32, and movement imparted to the latter will cause the guide bars to move to or from their common median line. These bars are urged to their central or inner position by means of springs 43, these springs being interposed between the lug 37 on the brace member and the collar 40. Movement in the opposite direction is caused by the yoke 45, this yoke having openings in which the rods 38 are loosely mounted. Extending through the rods back of the yoke, are pins 46 which are engaged by the yoke when the latter is moved outwardly, and thus moves the rods and connected mechanism.

The yoke 45 is rigidly attached to a bar 47 which bar is slidably mounted in suitable bearings in the frame members and is longitudinally slidable by the means hereinafter described. By this construction when the yoke is positioned against the frame members, the various rods 38 are free to move towards the front of the machine under the action of springs 43. This movement continues until it is arrested by contact of the corresponding guide bar with the fruit. In this position the bar is locked. On the outward movement of the yoke 45, each of the rods 38 after being unlocked, is picked up and carried rearwardly so that the final open position of the various guide bars is always the same. When the guide bars have once been positioned on the fruit, the various bars may not be uniformily spaced from the center, but in whatever position they come to rest, this position is held by the locking mechanism next described.

Figure 4:
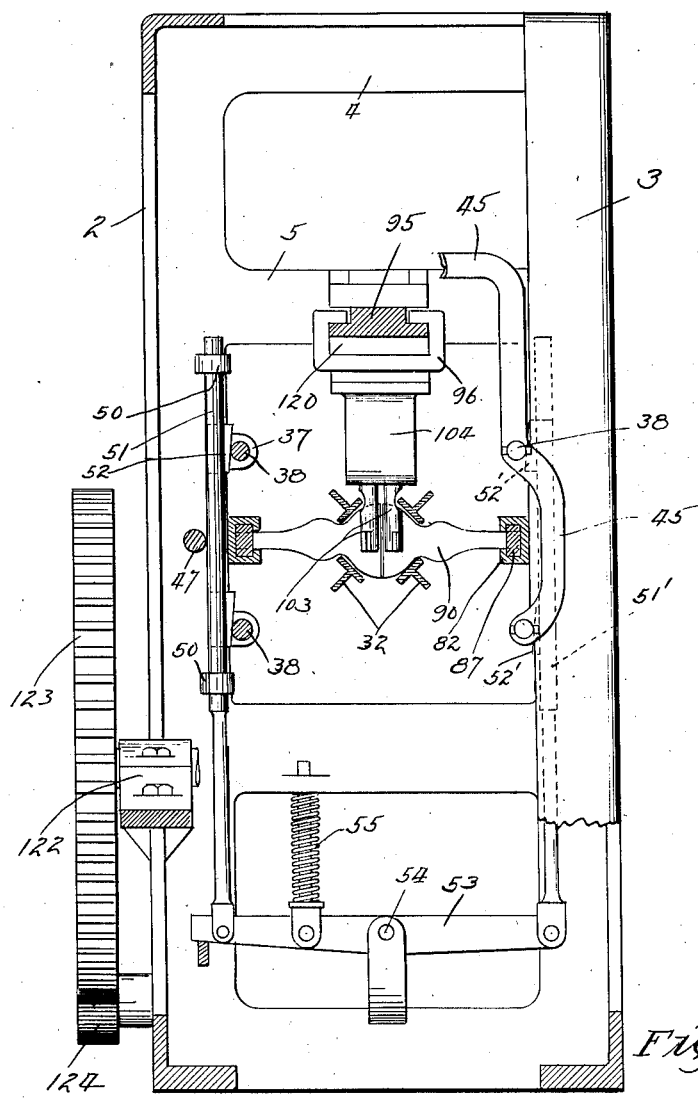
Fig. 4 is a view partly in vertical cross-section and partly in rear elevation.
Figure 7:
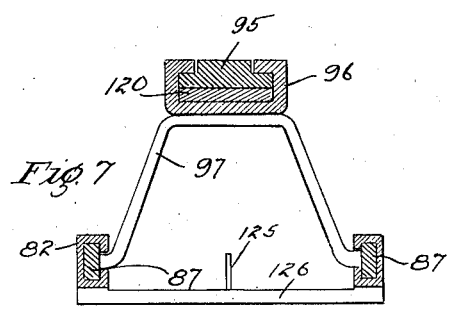
Figure 7 is a view in section on the line 7—7, Figure 3.

As shown in Figure 4, there are provided on the inside of each of the upright frame members certain vertical guides 50 in which are slidably mounted rods 51 and 51'. Attached to these bars are wedges 52 and 52', the inclined surfaces of which are adapted to contact with the rods 38. The wedges on rod 51' are inclined outwardly in a downward direction, while on the bar 51 they are inclined outwardly in an upward direction. The lower ends of the rods are connected to a rock arm 53 which is pivotally mounted in the center as shown at 54. A spring 55 is provided which acts on the rock arm and tends to engage the wedge surfaces with the rods 38. Movement of the rock arm in the opposite direction is caused by the cam operated rocking lever 56, which is pivotally mounted as shown at 57 and has one end which extends under the rock arm 53 and moves the latter upwardly on the side which is attached to the sliding rod 51. The rocking lever 56 is actuated by means of a cam 60 contacting with a roller 60', pivotally mounted on the lever as shown in Figure 2. The rock lever is also provided with an upwardly extending arm 61, which on its upper end is forked as shown at 62, and there engages a pin 63 which extends laterally from the bar 47. This construction causes the cam 60 through the arm 61 to reciprocate bar 47 in a forward and rearward direction.

Extending in a forward direction on the frame are certain lugs 66 and 67 having openings in which is slidably mounted a bar 68. This bar is depressed by a spring 69 and its downward movement is limited by a stop 70. The lower end is of a flat construction and slotted as shown at 71, and revolvably mounted in the slot is a circular knife 72. On the rear of the flat portion is formed an extension 73 having openings which serve as guides for the cutting knives 22. The frame below the center of the machine is provided with similar lugs 76 and 77 in which is slidably mounted a member 78 of a similar construction to member 68 and carrying a circular knife 79. This member is also provided with a rearwardly extending foot 80 having guide openings for the knives 22.

The fruit is urged between these circular cutting knives by means of the folding arms next described. Attached to the frame are certain guide bars 82 which extend parallel to the common center of the guides 32. These guides extend out beyond the forward end of the guide bars 32 and are then bent outwardly on an angle as shown at 86. Slidably mounted on these guides are bars 87, which on their forward ends have jointed sections denoted by 88. Extending outwardly from the slot in the face of the guides and attached to each of the jointed section 88 is a spoon like member 90, the other end of which is concave as shown at 91 for engagement with the fruit. The outer end of the two knives practically meet on the longitudinal center line of the machine. They are provided with a reduced neck portion 92 which provides clearance to enable the outer portions to enter between the guide bars 32, even when the latter are in their inner position.

Extending in a rearward direction from the frame is a guide bar 95 on which is mounted a sliding block 96. To the underside of this block is attached a yoke 97, the lower ends of which are in turn attached to the rear ends of the sliding members 87. The block just mentioned is moved upon the guide bar by means of the pivotally mounted lever 98. The upper end of this lever is in turn connected to a link 99 which is pivotally attached to the side of the block. The movement of the lever 98 is produced by a connecting rod 100 which is pivotally attached to the lever near its fulcrum point and has its other end pivotally mounted on a crank pin 101 which extends outwardly from the face of cam 60.

It will be noted that the knives 22 are slightly spread apart and mechanical means are provided for further spreading them as shown in dotted lines at 31. This mechanical means consists of a pair of spreader fingers 102 which are mounted in the lower ends of the oscillatively mounted pins 103. These pins are held in a suitable yoke 104 which is connected to the underside of the sliding block 120, and there are formed on the upper ends of the pins laterally extending arms 105. These arms are pressed in a forward direction by means of springs 106, which forward movement is limited by means of an adjusting screw 107. By means of these screws, the arms may be so adjusted that the points of the spreader fingers will just make contact with each other, and when thus in contact will be positioned in alignment with the slight opening between the cutting knives. It will be noted that the block 120 to which the yoke 104 is attached is mounted between the guide 95 and the under connecting portion of the block 96. The member 120 is thus movable independently of the sliding block, and a lost motion connection is provided between the two consisting of the slot 111 in the member 120 and a pin 112 in the sliding block 96.

Extending downwardly from the under surface of the lug 67 are pins 113, these pins being in the path of arms 105 so that after the latter contact with the pins and are then moved a slight distance further forward, the pins will be slightly rotated thus spreading the fingers 102.

Cam 60 is attached to a short shaft 121 which is revolvably mounted in a bearing 122 and provided on its outer end with a large toothed gear 123. Keyed to shaft 8 is a toothed pinion 124 which meshes with gear 123 so that for each revolution of the latter the pinion shaft will have to make a number of revolutions.

Having thus described the construction of my invention its operation is as follows:—

At the beginning of a cycle the bars 32 are positioned at their extreme outermost position, the pusher spoons are positioned as in Figure 6, and all parts are at rest. The fruit is then fed between the circular knives, with the pit lengthwise and the edges of the wider portion contacting with knives 72. The feeding may be done automatically by means which form no part of this invention, or it may be done by hand.

The fruit being thus positioned the flesh is cut by the circular knives which rest on the pit and as the fruit moves longitudinally these knives may spread apart against the tension of springs 69 to accommodate differently sized seeds. The clutch mechanism is then engaged which causes shaft 8 through the toothed gears to rotate cam 60. The raised portion of the latter at once passes from contact with the roller 60' allowing rods 38 to move forwardly under the pressure of springs 43. This forward movement of rods 38 through the connecting rods 42 pull the links 33 so that they move the bars 32 toward the median line of the machine. But as each bar 32 comes in contact with the fruit, its motion and that of the connected parts is arrested. In the meantime rock lever 53 is being moved downwardly by spring 55 and by the time all the guide bars have come to rest the various wedges 52 and 52' come into operation to hold them in this position.

At the beginning of the cycle the slide 120 is in its extreme position to the right as viewed in Figure 2, the fingers 102 are between the knives 22 and the latter are spread apart as shown at 31. When the fruit is positioned between knives 72 and 79 it is also penetrated by these fingers which thus help to hold the fruit until the guide bars close.

Next the sliding block 96 starts to move rearwardly carrying with it the strips 87. This draws the pivoted link 88 into the straight portion of the guides and so swings the spoons 90 into the position shown in dotted lines in Figure 1. They then enter between the guide bars and contact with the fruit and about the time they make contact the plate 120 is caught up by the pin 112, and the plate moved rearwardly. This releases arms 105 and allows the fingers to close on the pit so that as the sliding block continues its rearward movement the fruit is pushed by the members 90 and the pit is pulled by the fingers 102.

As previously explained the knives 72 may be separate to conform to pits of different sizes, and this displacement of the knives also operates to adjust the opening 31 for the varying sizes of seeds. This is so because as the knives separate, the extensions 73 and 80 which form guides for the flexible knives also move apart, thus forming a larger opening when the knives are spread apart.

Then as the pit advances, the knives under the tension of springs 30 straighten out and so follow the contour of the rear end of the pit. As they leave the latter they are straight so that as they pass outside of the fruit they cut only thin slices due to the fact that the guides 73 and 80 hold the knives slightly spaced.

Rearward movement of the block 96 continues until a point is reached where the fruit is directly over a discharge chute (not shown) when the cam 60 again frictions to release the wedges 52 and 52' and push the rod 47 rearwardly. This causes yoke 45 to engage the rods 38 which as previously explained opens apart the bars 32 so that the fruit may drop into the chute. The pit is retained in the grip of fingers 102 until it encounters the narrow strip 125 which is held by a bar 126 extending between the guides 82. This takes place at the extreme rearward movement of the guide block so that the fingers do not pass over the strip. The latter enter between the pins 103 and pushes the pit from between the fingers into another chute (not shown).

Figure 8:
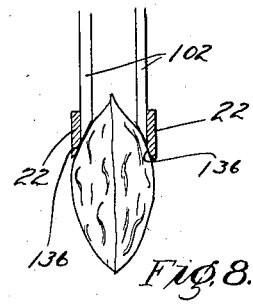
Figure 8 is an enlarged view in section through the cuttings knives showing the manner in which they contact with the fruit pit.

The sliding block then starts to return and the cycle is complete. The cutting knives heretofore mentioned are in the form of flat bands or strips and I find it advantageous to sharper them to the form shown in Figure 8. As there shown the adjacent forward edges are rounded off as shown at 136 whereby the knife is not so readily caught by the inequalities on the surface of the pit.

I claim as new and wish to cover by Letters Patent:—

1. A fruit pitting machine comprising parallel flexible cutting knives, means for reciprocating said knives, means for spreading said knives apart to enable the fruit pit to pass between them, and means for moving the fruit past said knives.

2. A fruit pitting machine comprising parallel bars forming a fruit guideway, two parallel closely spaced flexible knives reciprocally mounted to move traversely across said guideway, means for spreading said knives apart within said guideway, and means for moving fruit longitudinally along said guideway.

3. A fruit pitting machine comprising parallel bars forming a fruit guideway, means for causing a parallel movement of said bars toward a common center line, means for locking said bars, two parallel closely spaced flexible knives reciprocally mounted to move transversely across said guideway, means for spreading said knives apart within said guideway, and means for moving fruit longitudinally along said guideway.

4. A fruit pitting machine comprising parallel bars forming a fruit guideway, means for causing a parallel movement of said bars to engage the fruit in said guideway, means for locking said bars when in engagement with the fruit, means for unlocking and retracting said bars, two parallel closely spaced flexible knives reciprocally mounted to move traversely across said guideway, means for spreading said knives apart within said guideway, and means for moving fruit longitudinally along said guideway.

5. A fruit pitting machine comprising parallel bars forming a fruit guideway, means for causing a parallel movement of said bars to engage fruit held within said guideway, means for locking said bars when in engagement with the fruit, means for moving the fruit longitudinally through said guideway, two closely spaced flexible cutting knives, means for spreading said knives apart so as to pass over the pit of the fruit, and means for retracting said bars after the fruit has passed said knives.

6. A fruit pitting machine comprising a fruit guideway, parallel closely spaced cutting knives extending across said guideway, guides for said knives, longitudinally displaceable in reference to said knives, means for spreading said knives between said guides, and means for moving fruit between said knives.

7. A machine for separating the pit from the fleshy part of fruit comprising an adjustable fruit guideway, closely spaced flexible cutting knives movable across said guideway, extensible guides for said knives, means for spreading said knives between said guides, and means for moving the fruit longitudinally through said guideway.

8. A machine for separating the pit from the fleshy part of fruit comprising an adjustable fruit guideway, means for moving the fruit longitudinally therein, and two closely spaced flexible cutting knives extending across said guideway and adapted to spread apart to permit the passage of the pit therebetween.

9. A machine for separating the pit from the fleshy part of fruit comprising an adjustable fruit guideway, means for moving the fruit longitudinally therein, two flexible cutting knives extending traversely across said guideway, oppositely disposed dividing knives extending into said guideway, outwardly displaceable bars carrying said dividing knives, guides on said bars for said cutting knives, and means for spreading said flexible knives outwardly to allow the fruit pit to pass therebetween.

10. A machine for separating the pit from the fleshy part of fruit comprising an adjustable fruit guideway, means for moving the fruit longitudinally therein, and two flexible cutting knives extending traversely across said guideway, oppositely disposed dividing knives extending into said guideway, oppositely displaceable bars carrying said dividing knives, guides on said bars for said cutting knives, means for maintaining a uniform tension on said flexible knives, and means for spreading said knives apart to pass over the pit as the fruit is moved along said guideway.

11. A machine for separating the pit from the fleshy part of fruit comprising an adjustable fruit guideway, means for moving the fruit longitudinally therein, and two flexible cutting knives extending traversely across said guideway, oppositely disposed dividing knives extending into said guideway, oppositely displaceable bars carrying said dividing knives, guides on said bars for said cutting knives, spring means for maintaining a uniform tension on said flexible knives, means for spreading said flexible knives apart between said guides, and means for reciprocably moving said flexible knives.

12. A machine for separating the pit from the fleshy part of fruit comprising an adjustable fruit guideway, means for moving the fruit along said guideway, a pair of closely spaced flexible knives extending traversely across said guideway, guides for said knives movable radially with respect to said guideway, a pair of oscillatively mounted spreader fingers contacting on their outer ends to form a sharp edge for penetration between said flexible knives and means for spreading said fingers apart after they have entered between said knives.

13. A machine for separating the pit from the fleshy part of fruit comprising an adjustable fruit guideway, means for moving the fruit along said guideway, a pair of closely spaced flexible knives extending traversely across said guideway, a pair of oscillatively mounted spreader fingers contacting on their outer ends to form a sharp edge for penetration between said flexible knives and means for spreading said fingers apart after they have entered between said knives.

14. A machine for separating the pit from the fleshy part of fruit comprising an adjustable fruit guideway, means for moving the fruit along said guideway, a pair of closely spaced flexible knives extending traversely across said guideway, a pair of revolvably mounted circular cutting knives adapted to divide the fruit longitudinally, bars carrying said circular knives said bars being movable in a radial direction with respect to said guideway, guides for said flexible knives movable with said bars, a pair of spreader fingers adapted to enter between said knives, and means for moving said fingers apart after entering between said flexible knives.

15. A machine for separating the pit from the fleshy part of fruit, comprising a pair of flexible bands forming knives, means for conveying the fruit past said knives, and means for spreading said knives apart so as to pass over the pit as the fruit is moved, and radially extensible guides for holding said knives together on both sides of said spreader fingers, and means adapted to contact with the pit for positioning said guides according to the size of said pit.

16. A fruit pitting machine comprising parallel flexible knives, a fruit guideway, means for bowing said knives apart within said guideway, and folding pusher spoons adapted to move the fruit along said guideway.

17. A fruit pitting machine comprising an adjustable fruit guideway, a pair of flexible cutting knives extending through said guideway, means for bowing said knives apart within said guideway, pusher spoons movable longitudinally along said guideway for forcing the fruit past said cutting knives, and the pit of the fruit between the bowed portions of the knives.

18. A fruit pitting machine comprising parallel radially movable bars forming a fruit guideway, means for moving the bars apart to allow the placing of the fruit therebetween spring means for closing the bars on the fruit, parallel flexible knives extending across the guideway, and means for bowing the knives apart to allow the passage of the fruit pit between them.

19. A fruit pitting machine comprising parallel bars forming a fruit guideway, means for moving the bars radially apart to allow the insertion of the fruit, spring means for closing the bars on the fruit, means for locking the bars in their closed position, knives extending across the guideway for cutting the pit from the fruit, and means for moving the fruit along the guideway.

20. A fruit pitting machine comprising parallel bars forming a fruit guideway, means for moving the bars radially apart to allow the insertion of fruit therebetween, spring means independently closing each bar against the fruit, means for locking the bars against the fruit, flexible knives extending across the guideway, means for spreading the knives apart as the fruit passes them, and means for moving the fruit longitudinally along the guideway.

21. In a fruit pitting device, opposed flexible pitting strands, and means adapted to cause said strands to pass closely around the fruit pit and separate the pit from the fleshy part of the fruit without damaging the fleshy part of the fruit.

22. In a fruit pitting device, longitudinally tensioned parallel flexible pitting strands, and means adapted to cause said strands to pass closely around the fruit pit and separate the pit from the fleshy part of the fruit without damaging or distorting the fleshy part of the fruit.

23. In a fruit pitting device a pair of flexible tensioned pitting knives and means adapted to penetrate the fruit to cause the pit of the fruit to pass between the pitting knives to separate the pit from the fleshy part of the fruit.

24. In a fruit pitting device means for cutting through the flesh of the fruit to the pit and means including flexible tension members adapted to enter the cut and pass closely around the fruit pit to sever the flesh of the fruit from the pit.

25. In a fruit pitting device, flexible pitting knives, and means adapted to cause relative movement between the knives and the fruit to be pitted, the knives flexing to form a throat like opening varying progressively in shape to follow the contour of the fruit pit during such relative movement.

26. In a fruit pitting machine, a conveyor adapted to releasably hold the fruit regardless of its symmetry in a predetermined position, and means for halving the fruit in the plane of its greatest diameter.

27. In a fruit pitting machine, means for releasably holding the fruit regardless of its symmetry in a predetermined position, and means for halving the fruit in the plane of its greatest diameter, said latter means including means for imparting a relative motion between the fruit holding means and the fruit halving means.

28. In a fruit pitting machine, means for releasably holding the fruit regardless of its symmetry in a predetermined position, means for halving the fruit in the plane of its greatest diameter said latter means including means for imparting a relative motion between the fruit holding means and the fruit halving means, and means for removing the pit from the fruit, said last named means including means for imparting relative motion between the fruit and the pit in the plane of the greatest diameter.

In testimony whereof I affix my signature.

ERNEST A. MEACHAM.